(12) United States Patent
McLennan et al.

(10) Patent No.: US 11,212,727 B2
(45) Date of Patent: *Dec. 28, 2021

(54) METHOD AND APPARATUS FOR APPLICATION SPECIFIC MEDIUM ACCESS CONTROL AND PHYSICAL LAYER NETWORK BEHAVIOR MANIPULATION

(71) Applicant: Action Streamer, LLC, Cincinnati, OH (US)

(72) Inventors: Christopher S. McLennan, Cincinnati, OH (US); Alexander Jewell Motz, Cincinnati, OH (US)

(73) Assignee: Action Streamer LLC, Cincinnati, OH (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/590,874

(22) Filed: Oct. 2, 2019

(65) Prior Publication Data

US 2020/0037222 A1    Jan. 30, 2020

Related U.S. Application Data

(63) Continuation of application No. 16/400,254, filed on May 1, 2019, now Pat. No. 10,499,302.

(60) Provisional application No. 62/665,070, filed on May 1, 2018.

(51) Int. Cl.
| | |
|---|---|
| *H04W 36/30* | (2009.01) |
| *H04B 17/13* | (2015.01) |
| *H04W 28/06* | (2009.01) |
| *H04B 17/318* | (2015.01) |
| *H04B 17/345* | (2015.01) |
| *H04L 12/805* | (2013.01) |

(52) U.S. Cl.
CPC ............ *H04W 36/30* (2013.01); *H04B 17/13* (2015.01); *H04B 17/318* (2015.01); *H04B 17/345* (2015.01); *H04L 47/365* (2013.01); *H04W 28/06* (2013.01)

(58) Field of Classification Search
CPC ...... H04W 36/30; H04W 28/06; H04B 17/13; H04B 17/318; H04B 17/345; H04L 4/365
See application file for complete search history.

(56) References Cited

U.S. PATENT DOCUMENTS

| | | |
|---|---|---|
| 9,560,100 B1 | 1/2017 | McLennan |
| 9,930,083 B2 | 3/2018 | McLennan et al. |
| 10,499,302 B1 | 12/2019 | McLennan et al. |

(Continued)

OTHER PUBLICATIONS

Cisco, "Air Time Fairness(ATF) Phase1 and Phase2 Deployment Guide," Dec. 21, 2015, downloaded from https://www.cisco.com/c/en/us/td/docs/wireless/technolosy/mesh/8-2/b_Air_Time_Fairness_Phase1_and_Phase2_Deployment_Guide.html, 27 pgs.

(Continued)

*Primary Examiner* — Samina F Choudhry
(74) *Attorney, Agent, or Firm* — Frost Brown Todd LLC

(57) ABSTRACT

The behavior of devices on a network can be modified on the medium access control level to achieve various application level objectives. These types of modifications can include organizing the behavior of transmitting stations to achieve various objectives (e.g., equal allocation of airtime on a wireless network link) for the transmission of data back to those stations' access points. Other modifications, such as changing various stations' maximum data transmission size and modifying an access point's amplifier gain could also be made.

5 Claims, 5 Drawing Sheets

(56) References Cited

U.S. PATENT DOCUMENTS

| | | | |
|---|---|---|---|
| 2002/0019715 A1 | 2/2002 | Cohen et al. |
| 2015/0131469 A1 | 5/2015 | Kim et al. |
| 2016/0337869 A1 | 11/2016 | Dai et al. |
| 2017/0086024 A1 | 3/2017 | Do |

OTHER PUBLICATIONS

Gast, M.S., *802.11 Wireless Networks: The Definitive Guide*, $2^{nd}$ Ed., Chapter 4: Framing in Detail, O'Reilly Media, Inc., Sebastopol, CA, Apr. 2005, 60 pgs.

Høiland-Jørgensen, T. et al., "Ending the Anomaly: Achieving Low Latency and Airtime Fairness in WiFi," Karlstad University, arXiv:1703.00064v2 [cs.NI], Mar. 6, 2017, 14 pgs.

Høiland-Jørgensen, T. et al., "Ending the Anomaly: Achieving Low Latency and Airtime Fairness in WiFi," Proceedings of the 2017 USENIX Annual Technical Conference (USENIX ATC '17), Jul. 12-14, 2017, Santa Clara, CA, USA, pp. 139-151, 14 pgs.

Karaca, M., et al. "Resource Management for OFDMA bases Next Generation 801.11ax WLANs," arXiv:l602.07104v3 [cs.NI] Jan. 10, 2017, 8 pgs.

Yu, Si, et al., "A Responsible Airtime Approach for True Time-Based Fairness in Multiple-Rate WiFi Networks," Sensors, 2018, 18:3658, 19 pgs.

FIG. 7

METHOD AND APPARATUS FOR APPLICATION SPECIFIC MEDIUM ACCESS CONTROL AND PHYSICAL LAYER NETWORK BEHAVIOR MANIPULATION

CROSS REFERENCE TO RELATED APPLICATIONS

This is a continuation of, and claims the benefit of, U.S. non-provisional patent application Ser. No. 16/400,254, filed on May 1, 2019, which itself is a non-provisional of, and claims the benefit of, provisional patent application 62/665,070, filed May 1, 2018. Each of those applications is hereby incorporated by reference in its entirety.

FIELD

The technology disclosed herein can be applied to the operation of communication networks comprising a plurality of physical devices connected via a shared medium. In certain preferred embodiments, application layer logic may control medium access control (MAC) behavior on an 802.11 wireless network to prevent network performance from being degraded by stations with relatively low transmission speeds.

BACKGROUND

When a communication network comprising multiple devices operates over a shared medium (e.g., a portion of wireless spectrum, a single physical wire, etc.) an issue that often arises is that simultaneous transmissions by multiple devices can interfere with each other. To address this, various approaches to avoiding collisions have been implemented. However, these remedial measures often come with their own drawbacks. For example, in some cases the systems used to control when various devices can transmit data can have the (un)intended consequence of allowing slower devices to dominate the network. This can be particularly problematic in the case of wireless networks, where issues like interference and attenuation of signal strength with distance can significantly degrade the effective transmission speeds of transmitting devices. Accordingly, there is a need for improved technology for managing access to a shared communication medium used by a network comprising multiple devices. Additionally, there is a particular need for improved technology for managing the transmission of data from remote devices on a wireless communication network without allowing those devices to dominate or degrade the performance of the network's shared wireless link.

SUMMARY

Disclosed herein is technology which can be implemented in a variety of manners, including systems and methods for modifying the medium access control behavior of a wireless network to achieve various application level objectives. These modifications made include deploying various specialized software on access points, stations, or on other devices. Other ways of implementing the disclosed technology are also possible, and so the material set forth in this summary should be understood as being illustrative only, and should not be treated as limiting.

BRIEF DESCRIPTION OF THE DRAWINGS

The drawings and detailed description which follow are intended to be merely illustrative and are not intended to limit the scope of the invention as set forth in the appended claims.

FIG. 7 depicts an exemplary table that could be used access point auto-tuning.

DETAILED DESCRIPTION

Disclosed herein is novel technology which can be used for a variety of purposes, including management of access to a communication media (corresponding to the MAC sublayer of the data link layer in the OSI reference model) in a wireless communication network. As set forth herein, in some preferred embodiments, the disclosed technology may be used to operate an 802.11 network in a manner that uses application level considerations to avoid problems with standards in the 802.11 family (e.g., communication channels being dominated by lower performing devices). While, as described herein, such a network may be used for purposes such as streaming video data captured during a football game or other sporting event, it will be apparent to one of ordinary skill in the art that aspects of the disclosed technology can be applied in other contexts and for other uses. Accordingly, the disclosure set forth herein should be understood as being illustrative rather than limiting on the scope of protection provided by this or any related document.

Figure 1:
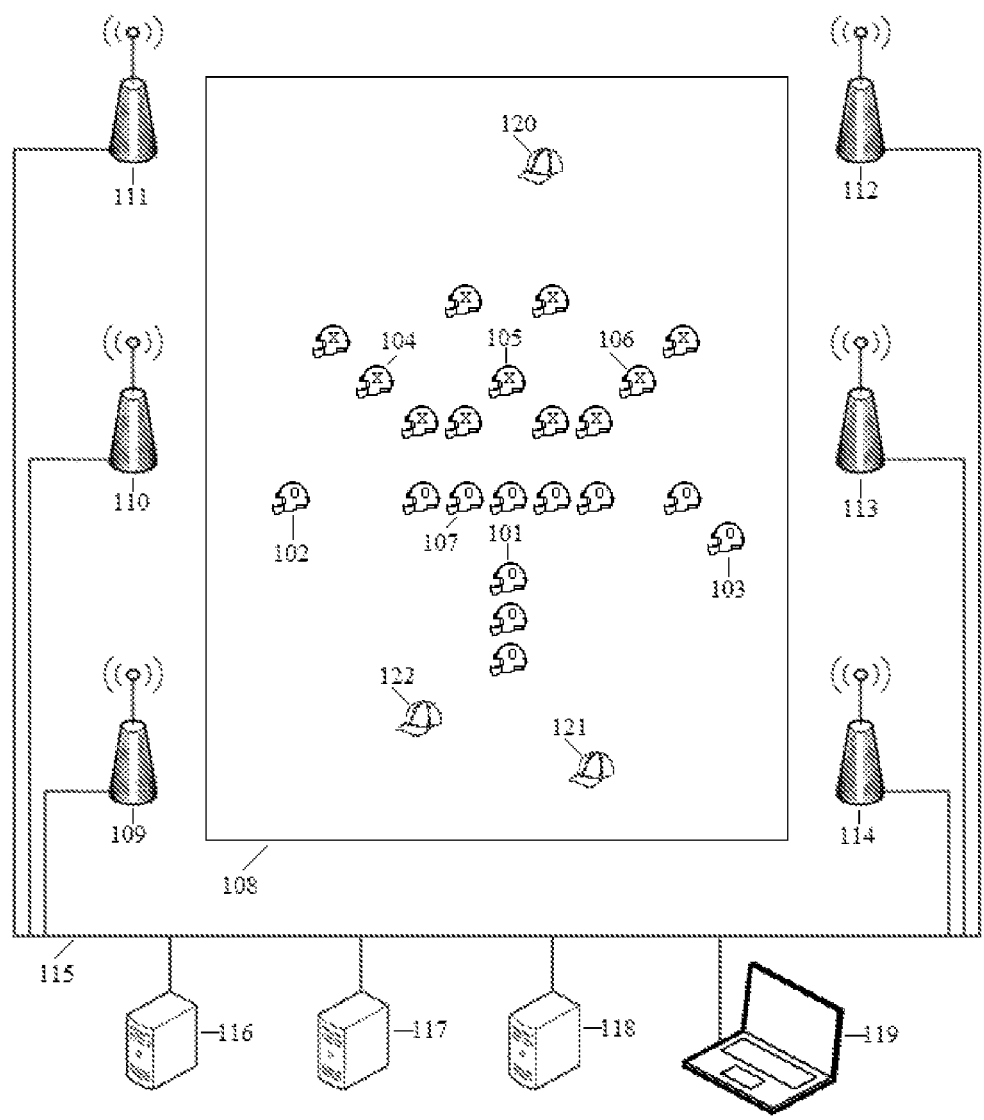
FIG. 1 depicts an environment in which aspects of the disclosed technology could be deployed.

Turning now to the figures, FIG. 1 provides a high level illustration of an exemplary environment in which some embodiments of the disclosed technology may be deployed. In that figure, a number of players with instrumented helmets [101-107] are engaged in a football game officiated by a number of officials with instrumented hats [120-122] on a football field [108]. As set forth below, these instrumented helmets [101-107] and instrumented hats [120-122] could be implemented in a variety of manners to enable the capture and transmission of video data during the football game. Exemplary instrumented helmets and hats are provided in U.S. Pat. No. 9,930,083 to McLennan et al. for a Method and Apparatus for an Interchangeable Wireless Media Streaming Device, the disclosure of which is incorporated by reference herein. Consistent with the terminology generally used with reference to 802.11 networks, in this disclosure the instrumented hats and helmets of FIG. 1 may be referred to as "stations."

The environment illustrated in FIG. 1 also includes a plurality of access points [109-114]. In practice, these access points [109-114] will preferably use a wireless communication channel to receive data from the instrumented helmets [101-107] and hats [120-122] and to send instructions to those helmets and hats regarding when and how that data should be transmitted and/or stored. The access points [109-114] will also preferably generate log files indicating any problems with these communications, such as dropped packets or interference on a particular channel.

In addition to communicating wirelessly with the instrumented helmets [101-107] and hats [120-122], the access points [109-114] will preferably also communicate over a wired network [115] with a plurality of communication servers [116-118]. In operation, the communication servers [116-118] will preferably convert the data from the instrumented helmets [101-107] and hats [120-122] into video streams suitable for display to a user, such as by decompressing the data and outputting it on a specified HDMI port, and/or performing other tasks such as applying smoothing functions and otherwise processing the video data.

In the environment depicted in FIG. 1, in addition to being used for communications between the access points [109-114] and the communication servers [116-118], the wired network [115] would also preferably be used for communications with a command and control computer [119]. In operation, the command and control computer [119] would preferably be used to generate commands which would cause the other devices depicted in FIG. 1 to operate in a manner which is consistent with the goals of the particular application for which the disclosed technology is being deployed. Additionally (or alternatively) in some embodiments a command and control computer [119] may be configured to control communications between the access points [109-114] and the various stations (i.e., instrumented helmets [101-107] and instrumented hats [120-122]) to optimize the performance of the wireless network.

Figure 2:
FIG. 2 depicts a scenario that could take place on a wireless network comprising two stations and an access point.

As an example of how performance of a wireless network operating in the environment of FIG. 1 could be optimized, consider the scenario depicted in FIG. 2. In that figure, two stations—station 1 [207] and station 2 [208]—have data (e.g., a portion of a video stream) to communicate which is stored in queues [202] on those stations. Additionally, in FIG. 2, one of the stations, station 2 [208], has transmitted (i.e., sent out a wireless signal encoding) a request to send (RTS) frame [203] that is intended to reserve the wireless medium used by the stations and the access point [209] for the duration of time necessary to transmit station 2's data [204]. The other station, station 1 [207], has not yet transmitted its RTS frame [205] or its data [206], and so both its RTS frame [205] and data [206] remain in its queue [201].

In some cases, a scenario such as shown in FIG. 2 would be followed by the access point [209] receiving station 2's RTS frame [203], and transmitting a clear to send (CTS) frame specifying that station 2 [208] was authorized to transmit its data [204]. This CTS frame would also prevent the remaining stations from transmitting during the period reserved for station 2 [208], thereby avoiding interference caused by simultaneous transmissions. Then, after that period had elapsed, another station (e.g., station 1 [207]) could transmit its own RTS frame, which would be followed by that station transmitting its own data once a corresponding CTS had been sent by the access point [209]. This process could continue to iterate with each of the stations with data to transmit requesting to reserve the wireless link and then transmitting that data once authorized by the access point.

However, in other cases a scenario such as shown in FIG. 2 may proceed differently. For example, consider a scenario in which the access point [209] does not receive the RTS [203] from station 2 [208] (e.g., due to interference) and station 1 [207] sends its own RTS [205] (e.g., because station 1 [207] also did not detect station 2's RTS [203], or because station 1 [207] did detect station 2's RTS [203] but did not detect a corresponding CTS within an interframe period it was configured to wait between frames for collision avoidance). This state of affairs is illustrated graphically in FIG. 3.

Figure 3:
FIG. 3 depicts a scenario that could take place on a wireless network comprising two stations and an access point.

In a scenario such as shown in FIG. 3, if the access point [209] receives the RTS [205] from station 1 [207] and responds by sending a CTS reserving the link for station 1 for the period station 1 needs to transmit its data [206], the result could be that station 2 [208] would be prevented from sending its data [204]. This could be problematic, especially if this was not the first time that station 2 [208] had been unsuccessful in reserving time to send its data [204].

To address this type of scenario, some systems implemented based on this disclosure could configure the access point [209] (or, preferably, a computer connected to the access point, such as the command and control computer [119] of FIG. 1) to identify situations where it should preemptively reserve the wireless link for a station that had not sent an RTS (or which has sent an RTS that has not been detected). For example, in some cases software running on an access point could track wireless link level parameters (e.g., disproportionate use of the wireless link, dropped frames, connection strength) and/or application level parameters (e.g., which devices are most likely to have data that would be of interest to an end user). This information could then be used to identify if a station has data to transmit (e.g., a camera on a helmet of a player involved in a particularly exciting play) but has been having difficulty in transmission (e.g., because they have more dropped frames), and preemptively send a CTS for that station even if no RTS for that station had been received. Preferably, this CTS will specify a relatively short duration for the wireless link to be reserved for the relevant station (e.g., long enough for that station to send a new RTS message, but not long enough for it to send a complete data payload), and the relevant station will respond with a new RTS message requesting enough time to send its data.

Figure 4:
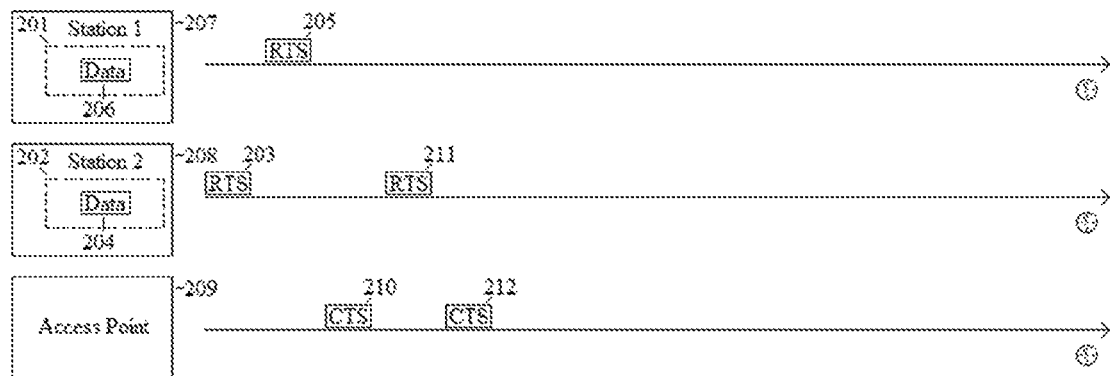
FIG. 4 depicts a scenario that could take place on a wireless network comprising two stations and an access point.

An illustration of this type of scenario is provided in FIG. 4. In that figure, the access point [209] sends a CTS [210] to station 2 [208] despite not detecting station 2's RTS [203]. Station 2 [208] would then preferably determine that the CTS [210] was sent preemptively (e.g., because it didn't reserve the transmission medium for enough time for station 2 [208] to transmit its data [204]) and respond by generating a new RTS [211] requesting sufficient time for station 2 [208] to transmit its data [204]. When this new RTS [211] was received by the access point [209] (which would be less likely to be prevented due to interference since the CTS [210] would have cleared the wireless link for station 2 [208] to transmit the new RTS), the access point [209] could reply with a new CTS [212] allocating the wireless link to station 2 [208] for enough time for that station to transmit its data [204]. In this way, station 2 [208] could be allowed to transmit its data even though the access point [209] may not have detected station 2's original RTS [203] and may having pending RTS messages from other stations with stronger signals (e.g., station 1).

Of course, it should be understood that the above discussion of the scenarios of FIGS. 2-4 is intended to be illustrative only, and that variations on the above discussion could easily be implemented by those of ordinary skill in the art in light of this disclosure. For example, in some embodiments, as an alternative to (or in addition to) case by case determination such as described above, an access point may use preemptive CTS messages to more systematically prioritize and structure communications from its connected stations. To illustrate, consider FIG. 5, which illustrates a process that could be used by an access point to determine whether (and to which station) to send a CTS. This process, which may be run on a loop by the access point, begins by updating [501] values representing expected backlogs for data to be transmitted by each of the stations connected to the access point. This updating [501] may include, for a station that has transmitted data since the previous update, reducing that station's expected backlog by the amount of the transmitted data. The updating [501] may also include estimating the amount of data that had been generated but not transmitted by each station since the previous update. For example, an embodiment of the disclosed technology deployed in an environment such as shown in FIG. 1 could estimate the amount of data generated but not transmitted by the instrumented helmets [101-107] by assuming that the helmets were capturing video data continuously and then using the parameters for that video capture (e.g., framerate, bit depth, etc.) to determine the likely amount of data represented by the captured video.

Figure 5:
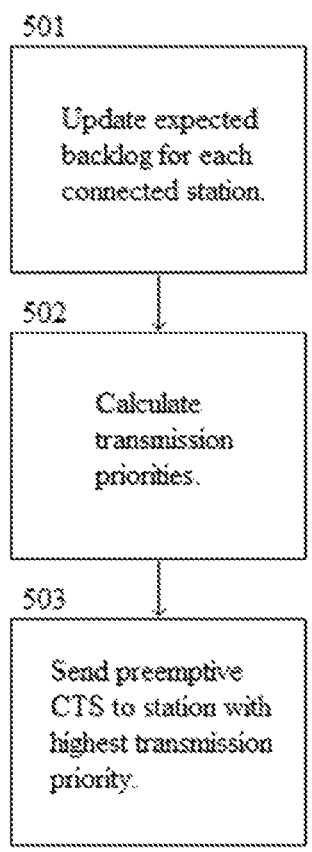
FIG. 5 depicts a process that could be used by an access point to determine whether (and to which station) to send a CTS.

Additionally, in some embodiments that implement a process such as shown in FIG. 5, updating [501] may account for factors other than simply the amount of data (expected to be) generated and received. For example, in an embodiment where the connected stations were configured to buffer data for transmission, an access point may be configured to not increase the expected backlog for a station once that station's buffer limit was reached even if no new data was received from that station. Similarly, in some embodiments, if an access point sends a CTS to a station and doesn't receive any data in return, the access point may be configured to assume that (despite expectations) that station may not have data to transmit and so may clear the expected backlog value for that station. As example of another type of variation, in some embodiments, application level logic may indicate that data a station is collecting is unlikely to be of any interest (e.g., that station is an instrumented hat for a referee observing a part of a football field that is not involved in the current play) and may treat the expected backlog for that station as zero to reflect that it could be expected to have no data worth transmitting (as opposed to no data at all). Accordingly, in light of these (and other) modifications that could be made to the updating [501] in a process such as shown in FIG. 5, the discussion of updating [501] should be understood as illustrative only, and should not be treated as limiting even on embodiments which do include such an activity.

Continuing with the discussion of FIG. 5, in an embodiment following that process, after the expected backlogs have been updated [501], a transmission priority can be determined [502] for each of the connected stations. This transmission priority could be determined in a manner similar to that discussed above for determining if a preemptive CTS message should be sent to a device, though in some embodiments the various stations' expected backlogs may also be considered (e.g., an access point could be configured to increase a station's priority if it had a larger expected backlog). Finally, after determining the transmission priorities, a preemptive CTS message similar to that discussed in the context of FIG. 4 could be sent [503] to the station whose transmission priority was highest. In this way, by appropriately tweaking the updating [501] and transmission priority determination [502], the disclosed technology could control transmissions from stations to achieve whoever objectives (e.g., prioritized throughput for station transmissions, equal or prioritized airtime for the various devices, etc.) were seen as most appropriate in its particular context.

Of course, it should be understood that controlling access to a communication link through methods such as preemptive CTS messages as described above is not the only way in which the disclosed technology could allow users to customize the behavior of a network to achieve various objectives. As an example of another type of modification which could be made using aspects of the disclosed technology, consider the possibility for modifying the maximum amount of data that would be included in any particular transmission (the MTU). As shown below in table 1, using the same MTU for all devices on a network can result in data transmission taking a much greater time for slower than faster stations.

TABLE 1

Transmission times for constant size 1500 B MTU by stations with different connection speeds.

| Connection Speed (Mbps) | Transmission time for 1500 B MTU (microseconds) |
| --- | --- |
| 300 | 40 |
| 150 | 80 |
| 75 | 160 |

This can be detrimental for various reasons, such as allowing the transmission link to be dominated by slower devices (if the network was implemented to allow the same number of MTUs to be transmitted by each device), to making the slower devices wait an inordinate amount of time before they would be allowed to transmit at all (if the network was implemented to balance the time each device was allowed to use the communication link).

To address this, some systems implemented based on the disclosed technology could be configured to modify the MTUs for the various stations on a network based on those stations' connection speeds. For example, an access point could be configured to track the connection speeds of the stations it was connected to and to send instructions to software on those stations instructing them to modify their MTUs so that the clock time taken by each station for transmitting one of its MTUs would be the same. For instance, the fastest station connected to an access point may be given the highest MTU permitted by the underlying network protocol (e.g., 2400B in an 802.11 network) and the other stations may have their MTUs scaled based on the time it would take the fastest station to transmit one of its MTUs. An example of how this could be reflected on a network with stations having three different transmission speeds is provided below in table 2.

TABLE 2

Exemplary variations in MTU sizes to equalize MTU transmission clock times.

| Connection Speed (Mbps) | MTU size (bytes) | Transmission time for 1 MTU (microseconds) |
| --- | --- | --- |
| 300 | 2,400 | 64 |
| 150 | 1,200 | 64 |
| 75 | 600 | 64 |

Of course, it should be understood that MTU modification for clock speed equalization as described above is only one example of how MTUs might be modified in systems implemented based on this disclosure, and should not be treated as implying limits on the types of MTU modifications contemplated by the inventors. For instance, in some implementations, rather than modifying MTUs to equalize transmission times across devices, factors similar to those discussed above in the context of determining whether to send a preemptive CTS could also be used in determining a desired MTU for a particular station (e.g., factors that would be used to assign a higher priority for data from a particular station could also be used to increase the desired MTU for that station). Similarly, in some implementations, rather than scaling MTUs for slower devices in a linear manner based on the MTU for the fastest device, MTUs for slower devices have different scaling relationships, such as logarithmic or polynomial relationships, to the MTU for the fastest devices. Alternatively (or as an additional feature), some implementations may offer a user the ability to manually indicate that an MTU should be increased or decreased for a particular device, such as if it appears that that device is being starved. Accordingly, the discussion above of manners in which MTUs may be modified in various embodiments should be understood as being illustrative only and, like the description of preemptive CTS messages, should not be treated as limiting.

It should also be understood that, while the discussion of preemptive CTS messages and modifications to MTUs focused on changes to station behavior, some implementations of the disclosed technology may also (or alternatively) modify access point behavior to improve the ability of a network to achieve the objective(s) for which it is deployed. To illustrate, consider the possibility of modifying an access point's signal strength in a manner that will decrease the access point's coverage, but that may increase the transmission speed for stations closer to the access point (e.g., by decreasing an access point's amplifier gain when its connected stations are close enough that a higher gain might degrade their communication). In embodiments where this type of access point behavior modification is present, one way it may be implemented would be to begin with an access point at maximum transmission power, and then automatically adjusting the access point's transmission power to provide an environment in which all stations connected to that access point are able to negotiate as fast a data rate as possible. An example of a process that could be used for this kind of access point auto-tuning is provided in FIG. 6, discussed below.

Figure 6:
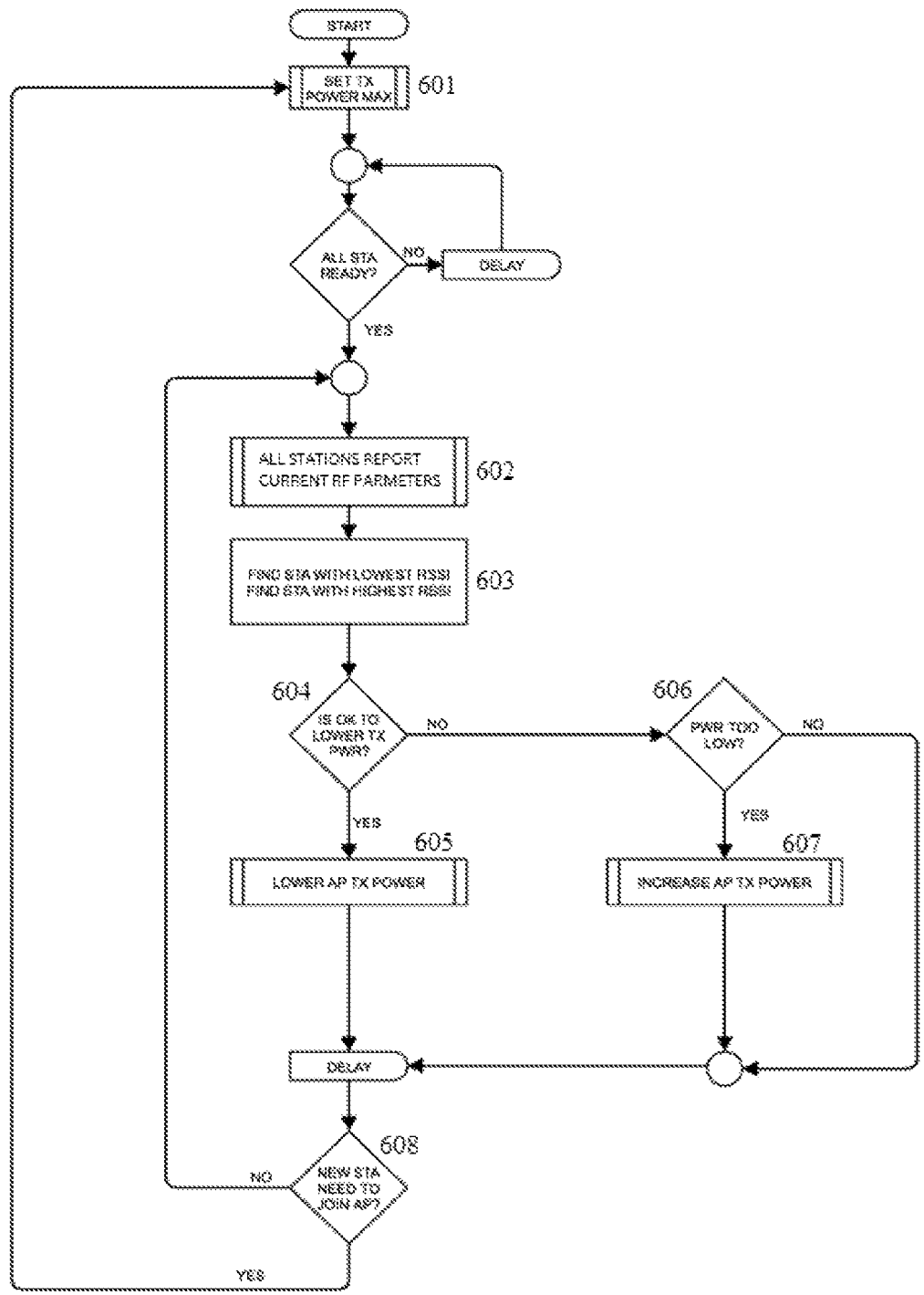
FIG. 6 depicts an access point auto-tuning process that could be used in some embodiments.
Figure 7:
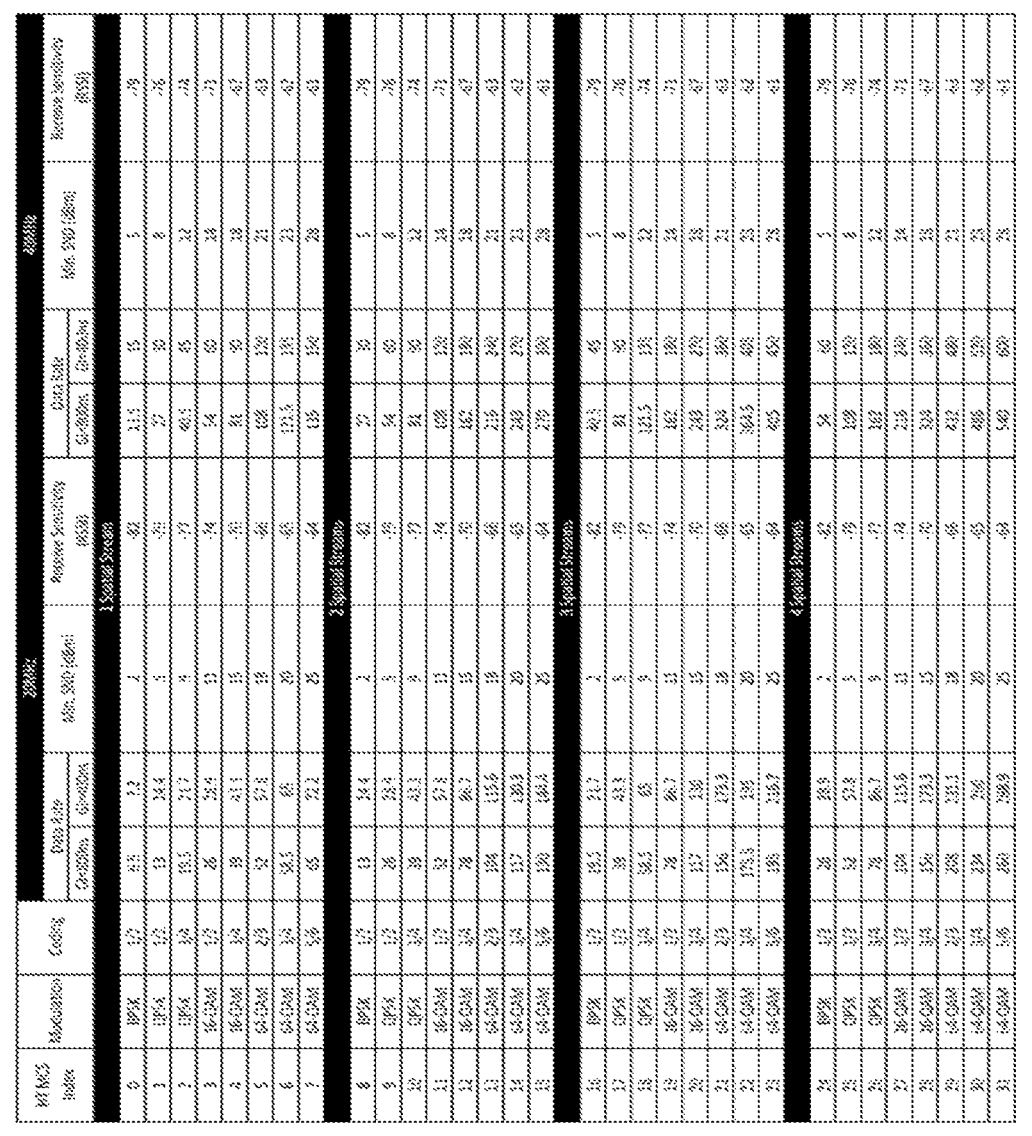

In the process of FIG. 6, initially (e.g., on system startup) the transmission power of an access point can be set [601] to its maximum intensity. Then, once all stations allocated to that access point have established connections, each of those stations could report [602] various data regarding their connections, such as received signal strength (reported in dBm), and signal to noise ratio. From this information, the stations with highest and lowest received signal strength (RSSI) measurements could be identified [603] and the information from those stations could be used to determine if any changes should be made to the transmission power of the access point. For example, in some embodiments, a check [604] could be made of whether it would be acceptable to lower the access point's transmission power. Such a check [604] could make use of a table such as shown in FIG. 7, to determine if the lowest RSSI station had a SNR lower than the minimum SNR given the MCS index for its current RSSI and lowering the transmission power for the access point would not result in the highest RSSI station going to a lower MCI index. Additionally, in some embodiments such a check [604] could include an empirical component. For example, in some embodiments, stations may be operated using drivers that would continuously try to negotiate a higher MCS index. In this case, a determination of whether lowering transmission power would result in the highest RSSI station going to a lower MCS index could be made by lowering the transmission power and then, if highest RSSI station lowered its MCS index, reverting to the previous (higher) signal strength so that that station's MCS index would not be unnecessarily impacted. However, the check [604] was made, if it was determined that it would be acceptable to lower the access point's transmission power, then the transmission power could be lowered [605].

A similar determination [606] could also be made of if the access point's transmission power was too low. For example, a table such as shown in FIG. 7 could be used to check if the SNR for the access point with the lowest RSSI was greater than the minimum SNR for the next highest MCS index. If so, the determination [606] could be treated as indicating that the transmitting power of the access point was too low, and the transmitting power could accordingly be increased [607]. This process, (i.e., reporting [602] RF parameters, followed by lowering [605] or raising [607] the access point's transmission power as appropriate) could then be repeated periodically (e.g., every second), thereby allowing a system implementing this aspect of the disclosed technology to dynamically adjust transmission behavior in a manner that optimizes performance of the network in real time. Additionally, when a new device is added [608] to the access point (see U.S. Pat. No. 9,930,083 for examples of situations where this may take place), the access point's behavior could effectively reset, reverting to maximum power and then auto-adjusting as described above so that its transmission behavior was appropriate for all of the stations, including the one that was newly added.

Of course, modifications on the auto-adjustment as described above are possible, and could be implemented by those of ordinary skill in the art without undue experimentation in light of this disclosure. For example, instead of simply maximizing the success of all stations (i.e., by checking whether transmission power could be raised or lowered based on its impact on the lowest RSSI station), it is possible that some embodiments could weight the impact of changes on various stations based on the priority of the streams being transmitted by those stations. Similarly, in some embodiments, access point behavior could be adjusted to maximize total bandwidth for all connected stations, rather than focusing on the minimum and maximum RSSI stations as described above. Other types of variation, such as variations in devices that actually perform various processing tasks described herein, are also possible. For instance, while the above description tended to refer to an access point making various changes or performing various processes, it is possible that, in some implementations, processing described above as being performed on an access point may be performed on a separate device (e.g., a command and control computer [119], or a dedicated computer configured to manage network traffic) with only the output communicated to the access point for transmission to the relevant station(s).

In light of the potential for variations and modifications to the material described explicitly herein, the disclosure of this document should not be treated as implying limits on the protection provided by this document or any related document. Instead, the protection provided by a document which claims the benefit of or is otherwise related to this disclosure should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

Explicit Definitions

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "first," "second" and other modifiers which precede nouns or noun phrases should be understood as being labels which are intended to improve the readability of the claims, and should not be treated as limitations. For example, references to a "first communication server" and a "second communication server" should not be understood as requiring that one of the recited servers precedes the other in time, priority, network location, or any other manner.

When used in the claims, a "means for improving application layer functionality by modifying default medium access control layer or default physical layer operation of the wireless network" should be understood as a means plus function limitation as provided for in 35 U.S.C. § 112(f), in which the function is "improving application layer functionality by modifying default medium access control layer or default physical layer operation of the wireless network" and the corresponding structure is a computer coupled to a transceiver (which could be physically disposed in a common housing with the computer, or could be disposed in a separate housing from the computer) and configured to perform one or more of the preemptive CTS processes illustrated in FIGS. 2-5 and described in the corresponding text, the MTU modification processes described in the text accompanying tables 1 and 2, and/or the dynamic signal strength modification processes as illustrated in FIG. 6 and described in the text corresponding to that figure.

When used in the claims, a "means for sending preemptive clear to send frames to particular stations from the plurality of stations" should be understood as a means plus function limitation as provided for in 35 U.S.C. § 112(f), in which the function is "sending preemptive clear to send frames to particular stations from the plurality of stations" and the corresponding structure is a computer coupled to a transceiver and configured to perform preemptive CTS process illustrated in FIGS. 2-5 and described in the corresponding text.

When used in the claims, a "means for modifying maximum transmission units for particular stations" should be understood as a means plus function limitation as provided for in 35 U.S.C. § 112(f), in which the function is "modifying maximum transmission units for particular stations" and the corresponding structure is a computer coupled to a transceiver and configured to perform MTU modification processes as described in the text accompanying tables 1 and 2.

When used in the claims, a "means for auto-tuning gain based on signal to noise ratio data" should be understood as a means plus function limitation as provided for in 35 U.S.C. § 112(f), in which the function is "auto-tuning gain based on signal to noise ratio data" and the corresponding structure is a computer coupled to a transceiver and configured to perform dynamic signal strength modification processes as illustrated in FIG. 6 and described in the text corresponding to that figure.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

What is claimed is:

1. A system comprising a wireless network comprising an access point and a plurality of stations, wherein:
   a) each station from the plurality of stations is configured to transmit data captured by a sensor connected to that station wirelessly to the access point over a shared medium;
   b) the access point is configured with a non-transitory computer readable medium having stored thereon instructions adapted to, when executed, cause the access point to improve application layer functionality by
      modifying default physical layer operation of the wireless network.

2. A method of operating a wireless network comprising an access point and a plurality of stations, the method comprising:
   a) each station from the plurality of stations capturing data using a sensor connected to that station;
   b) each of one or more stations from the plurality of stations transmitting data captured by the sensor connected to that station to the access point over a shared medium, wherein each station from the plurality of stations is configured to transmit data captured by the sensor connected to that station to the access point over the shared medium; and
   c) the access point improving application layer functionality by
      modifying default physical layer operation of the wireless network.

3. A machine comprising:
   a) a plurality of stations, wherein each station from the plurality of stations is configured to transmit data captured by a sensor connected to that sensor over a wireless network; and
   b) a means for improving application layer functionality by modifying default medium access control layer or default physical layer operation of the wireless network, wherein the means for improving application layer functionality by modifying default medium access control layer or default physical layer operation of the wireless network is a means for auto-tuning gain based on signal to noise ratio data.

4. The system of claim 1, wherein improving application layer functionality by modifying default physical operation of the wireless network comprises performing dynamic modification of signal strength for the access point.

5. The method of claim 2, wherein the access point improving application layer functionality by modifying default physical layer operation of the wireless network comprises performing dynamic modification of signal strength for the access point.

* * * * *